United States Patent Office

3,034,903
Patented May 15, 1962

3,034,903
METHOD FOR DEGREENING AND IMMUNIZING FRESH FRUIT
Charles D. Cothran, Pomona, Calif., assignor to Brogdex Company, Pomona, Calif., a corporation of California
No Drawing. Filed May 31, 1960, Ser. No. 32,539
8 Claims. (Cl. 99—154)

This invention is concerned with a method for treating fresh fruit. More specifically, it pertains to a method for degreening and immunizing of fresh fruit so as to achieve a deep and even coloration characteristic of normally ripe and mature fruit and concurrently retarding decay due to mold and fungus growth without burning and discoloration of such fruit and without substantial deposition of a residue having an offensive taste or toxic effects on humans.

Fresh fruit growers have always been faced with the problem of transporting their produce to the ultimate consumer with a minimum of loss due to spoilage. Part of the problem lies in retarding the growth of mold, fungus and other such organisms which cause decay and deterioration of the fruit. Another part of the problem lies in the fact that citrus fruit such as oranges at early stage in its development often achieves the deep and even coloration characteristic of ripe fruit and then returns to a greener and spotted coloration when it reaches full maturity in size and sweetness of taste. Such "greening" appears to be due to climatic conditions, and while the edibility is unimpaired, its saleability is impaired. If such fruit were left unpicked merely to obtain a ripe appearance, it would become overripe and suffer excessive spoilage before transportation to the consumer. Consequently it is customary to pick citrus fruit such as oranges at the proper stage of maturity and then treat it with a degreening agent so that the fruit has a ripe appearance corresponding to its actual stage of development. Lemons are generally picked for size, irrespective of color, and stored until yellow and cured at which time they may be marketed; however, should cured fruit not be available, the lemons may also be degreened just prior to shipment.

Some examples of solutions of the prior art to the problems of retarding decay and degreening of fresh fruits may be found in the Keller Patents 2,577,421, 2,755,188 and 2,828,210 where agents such as a mixture of trichloroethane-ethylene dichloride have been used to treat various kinds of fruits.

In recent years, there has been a growing awareness that many of the additives used to treat food may have undesirable side effects even though present in small amounts. For example, the common agent formerly used for retarding decay and degreening of fresh fruit was a mixture of 1,1,2-trichloroethane and ethylene dichloride which left considerable residue in and on the fruit. The recommended limit for human exposure to ethylene dichloride is 100 p.p.m. (parts per million) in the air and for exposure to 1,1,2-trichloroethane is 25 p.p.m. Thus it can be seen that such agent, because of relatively high residues and relatively high toxicity, may have significant undesirable toxic effects on humans. In addition this agent had the undesirable characteristics of having a relatively low vapor pressure and volatility, of being flammable and of having a flash point. The Food and Drug Administration and other governmental bodies now do not permit the use of 1,1,2-tricholoroethane.

The present invention comprises a method for the degreening and retarding decay of fresh fruit by use of a mixture of 1,1,1-trichloroethane methylene chloride which produces unexpectedly better results than its components individually and has other desirable characteristics which distinguish the mixture from prior materials. Both components of this mixture have a recommended limit for human exposure of 500 p.p.m. and leave relatively low residues so that there is an insignificant toxic effect on humans. In addition this mixture has high vapor pressure and volatility, is not flammable and has no flash point. Thus not only does this mixture get improved results over the prior art but it does it more easily and safely and gives a much safer product.

Consequently, an object of the present invention is a method for the degreening and immunizing of fresh fruit so as to achieve a deep and even coloration characteristic of normally ripe and mature fruit and concurrently retarding decay due to mold and fungus growth without burning and discoloration of such fruit and without substantial deposition of a residue having an offensive taste or toxic effects on humans.

Another object of the present invention is to degreen and immunize fresh fruit with an agent characterized by having a high volatility and vapor pressure, no flash point, non-flammable and having very low toxicity for humans.

Another object of the present invention is to improve prior methods of the degreening and immunizing of fresh fruit and yet substantially reduce the toxic effect on humans resulting from such treatment.

A further object of the present invention is to disclose novel combinations of materials having exceptionally effective characteristics, and conditions of use thereof, in the treatment of various fresh fruit.

Another object of the present invention is to degreen and immunize fresh fruit with a mixture of 1,1,1-trichloroethane-methylene chloride using the mixture alone or in the presence of ethylene so that the resulting fruit contains a low residue with very low toxicity but better coloration and immunization than that obtained with the individual components of the mixture.

Other objects of the present invention will be obvious from the following description of the invention.

The practice of the present invention involves subjecting the fresh fruit in a storage chamber to the action of vapors from a liquid mixture consisting of 1,1,1-trichloroethane and methylene chloride. The storage chamber may be an enclosure purely for storage purposes or may be the enclosure used for transportation such as a railroad car or truck. The mixture is usually admitted to the storage chamber in the liquid form and then vaporized (as from any suitable pan or vaporizer) but it may be admitted in the vapor form. The various methods for admitting treating agents to fruit storage chambers, vaporizing them therein, if necessary, and insuring contact of the fruit with the agent are well known in the art as can be seen from the patents mentioned above so these details need no discussion. The optimum composition of the liquid mixture of 1,1,1-trichloroethane-methylene chloride for treatment of oranges is approximately equal parts by volume; however the proportions of two compounds may be varied within wide limits depending upon the fruit being treated with most fruits falling within the preferred range of 25 to 75 volume percent of 1,1,1-trichloroethane and 75 to 25 volume percent of methylene chloride.

The optimum concentration of the liquid mixture for the treatment of citrus fruit such as oranges is approximately 2 to 3 cubic centimeters of such liquid mixture per cubic foot of storage space in which the fruit is being treated; however, the concentration just like the proportions of the components in the mixture may vary over wide limits depending on the kind of fruit, its condition and the results desired. Most fruits at the proper stage of maturity fall within the preferred range of 1 to 4 cubic centimeters of liquid mixture per cubic foot of storage space. The preferred temperature range depends upon the fruit being treated with the temperature range for oranges being about 72–80° F. and for strawberries being about 32–45° F. However, the preferred temperature for most fruits is below 80° F. The preferred length of time to which fruit is subjected to the vapor mixture will vary with the type of fruit being treated, its condition, the result desired and to some extent upon the ambient temperature: the time for oranges being about 60 hours and for strawberries being about 72 hours. However the preferred time for most fruit is above 48 hours.

The treatment of the fresh fruit with a mixture of 1,1,1-trichloroethane-methylene chloride may or may not be carried out in the presence of ethylene. The use of ethylene with the mixture improves the degreening of the fruit and shortens the time required for treatment. The preferred concentration of ethylene for treatment of oranges is approximately between 5 and 6 cubic centimeters of gas per cubic foot of the storage chamber; however, the concentration may vary over very wide limits depending on the kind of fruit, its condition and the results desired.

Most fruit at the proper stage of maturity falls within the preferred range of 2 to 9 cubic centimeters of ethylene gas per cubic foot of storage space.

Tests were run to compare the degreening results of the mixture of 1,1,1-trichloroethane-methylene chloride with respect to the mixture of 1,1,2-trichloroethane-ethylene dichloride previously used and abandoned because of its toxicity. The mixture of 1,1,1-trichloroethane-methylene chloride used contained equal liquid volumes of each component. The 1,1,1-trichloroethane used contained 2.4 to 3.0 percent dioxane and 0.12 to 0.30 percent butanol. The dioxane and butanol were added merely to prevent the attack of aluminum alloys and have no effect with respect to the degreening of the fruit. The mixture of 1,1,2-trichloroethane-ethylene dichloride used contained 63.52% ethylene dichloride and 36.48% of 1,1,2-trichloroethane which was the proportion which was normally used. The test procedure was as follows: 15 Valencia oranges used in each group; groups were sealed in 55 gallon metal drums with towels moistened with water and held at a temperature of 72–80° F. The other test details and results for a representative test are set forth in the table below:

Table I

| Material [1] | Quantity, ccs. | Time Gassed, hrs. | Rating [2] |
| --- | --- | --- | --- |
| 1,1,1 - Trichloroethane - Methylene Chloride | 17.2 | 52 | 1 |
| 1,1,2 - Trichloroethane - Ethylene Dichloride | 17.2 | 52 | 2 |
| Ethylene Gas | 40.1 | 52 | 3 |

[1] 40.1 ccs. ethylene gas were added to each drum every 24 hours.
[2] Rating is based on an inspection of the resulting fruit by experienced observers. The resulting fruit is compared with respect to depth and evenness of color so as to appear most naturally ripe, and absence of any discoloration or burning.

Tests were also run to determine the relative effects of 1,1,1-trichloroethane and methylene chloride individually and in various proportions of the two components. The general procedure was the same as that set forth above. Specific test details and results for a representative test are set forth in the table below:

Table II

| Material [1] | Quantity, ccs. | Time Gassed, hrs. | Rating [2] |
| --- | --- | --- | --- |
| 1,1,1 - Trichloroethane - Methylene Chloride | 8.6 / 8.6 | 52 | 1 |
| 1,1,1 - Trichloroethane - Methylene Chloride | 12.2 / 5 | 52 | 2 |
| Methylene Chloride | 17.2 | 52 | 3 |
| 1,1,1 - Trichloroethane | 17.2 | 52 | 4 |
| Ethylene Gas | 40.1 | 52 | 5 |

[1] 40.1 ccs. ethylene gas were added to each drum every 24 hours.
[2] Rating is based on an inspection of the resulting fruit by experienced observers. The resulting fruit is compared with respect to depth and evenness of color so as to appear most naturally ripe, and absence of any discoloration or burning.

The results of these tests clearly show that the mixture of 1,1,1-trichloroethane-methylene chloride is a better degreening agent than either of its constituents and also than the previously used mixture of 1,1,2-trichloroethane-ethylene dichloride. These tests also indicate that equal liquid volumes of 1,1,1-trichloroethane-methylene chloride is the best ratio of the two components for oranges. Other tests indicated that the mixture of 1,1,1-trichloroethane-methylene chloride was virtually as effective or better than the mixture of 1,1,2-trichloroethane-ethylene dichloride with respect to decay control. Tests were run to determine the amount of residue left by the mixture of 1,1,1-trichloroethane-methylene chloride and the previously normally used mixture of 1,1,2-trichloroethane-ethylene dichloride. Oranges treated with 1,1,2-trichloroethane-ethylene dichloride were compared with untreated oranges by analysis for the amount of chlorine by precipitation in the form of Ag Cl. The following table gives the result of this residue test.

Table III

| Material | Whole Fruit Peel (p.p.m. of Ag Cl) | Whole Fruit Pulp (p.p.m. of Ag Cl) |
| --- | --- | --- |
| None | | 9.9 |
| 1,1,2-Trichloroethane - Ethylene Dichloride | 25.9 | 17.3 |

This test indicates that there is a substantial amount of residue left by 1,1,2-trichloroethane-ethylene dichloride since the permissible concentration of ethylene dichloride in air is 100 p.p.m. and of 1,1,2-trichloroethane is only 25 p.p.m. However such test is not a satisfactory means of determining the amount of residue left by 1,1,1-trichloroethane-methylene chloride because this mixture leaves substantially no residue. Consequently direct tests for the two compounds in the mixture were run on both the pulp and peel of several kinds of treated citrus fruit e.g. pink grapefruit and organges. These tests showed, first, no methylene chloride can be found in either peel or pulp of the citrus fruit. Second, no 1,1,1-trichloroethane can be found in the pulp of the citrus fruit. Third, a very small amount, 2.0 to 4.0 p.p.m. based on weight of skins, of 1,1,1-trichloroethane may be found in the skin of the citrus fruit.

It appears that the extremely low residues found in the fruit treated with 1,1,1-trichloroethane-methylene chloride is because the methylene chloride is not dissolved in the water solutions in the pulp nor in the oil in the skin of citrus friut. Similarly 1,1,1-trichlorethane is not dissolved in the water solutions in the pulp and only to a very little extent in the oil in the skin of citrus fruit. The excessive residues of 1,1,2-trichloroethane-ethylene dichloride also appears to be due to their solubility in the water solutions in the pulp and in the oil in the skin. This solubility of 1,1,2-trichlorethane-ethylene dichloride is shown by the fact large residues, as much as 200 p.p.m. may be found in the peels of treated citrus fruit even after 24 hours of airing subsequent to treatment.

These residue tests emphasize the superiority of the treating agent of the present invention. If no oil is present in the skin of the fruit e.g. strawberries, tomatoes and stone fruits, no residue remains from treatment with 1,1,1-trichloroethane-methylene chloride. Even in citrus fruits, the insolubility of 1,1,1-trichloroethane-methylene chloride in the water solutions in the pulp assures no residue in that portion of the citrus fruit normally consumed by humans. Thus the combination of very low toxicity and substantially no residue makes 1,1,1-trichloroethane-methylene chloride a very safe treating agent.

Tests were run to obtain similar data on degreening, decay control and residue on strawberries as was obtained for oranges. The test procedure was as follows: 3 pint boxes green capped local strawberries were placed in a sealed 55 gallon metal drum along with the material to be tested; the materials tested were the previously normally used mixture of 1,1,2-trichloroethane and ethylene dichloride (17.2 ccs.) and a mixture of 1,1,1-trichloroethane (8.6 ccs.) methylene chloride (8.6 ccs.); each drum was held at a temperature of 32 to 35° F. for 72 hours; then the same measured amount of the test material was placed in the drum and held for an additional 72 hours making the total gassing time 144 hours; the strawberries were then removed, aired for 5 hours and observed. The following table sets forth results of a representative test.

Table IV

| Material | Sound Berries, In Percent | Decay | | | Rank [1] | | |
|---|---|---|---|---|---|---|---|
| | | Spot, In Percent | Advanced, In Percent | p.p.m. Ag Cl | Fungicidal | Residue | Degreening |
| 1,1,1-trichloroethane methylene chloride | 17 | 76 | 7 | 6.4 | 1 | 1 | 1 |
| 1,1,2-trichloroethane ethylene dichloride | 18 | 67 | 15 | 70.0 | 2 | 2 | 2 |

[1] Rating is based on an inspection of the resulting fruit by experienced observers. The resulting fruit is compared with respect to depth and evenness of color so as to appear most naturally ripe, and absence of any discoloration or burning.

Such test results indicate that the 1,1,1-trichloroethane-methylene chloride mixture has an even more striking superiority over the 1,1,2-trichloroethane-ethylene dichloride mixture in the treatment of strawberries than in the treatment of oranges. It should be noted that the double treatment and the 144 hour period used in the test were used to simulate shipping of strawberries from California to a very distant point, such as New York or Boston. The treatment, of course, may also be used where the strawberries are to be sold within 24 hours.

It is understood that the foregoing examples and illustrations should be considered only as a description of the invention and not as limitations on the invention. For example, changes in percentages of the components will be readily apparent to one skilled in the art depending on particular circumstances and are contemplated as within the scope of the present invention. In addition, it is obvious that the method not only can be applied to all citrus fruits such as oranges, lemons and grapefruit and berries such as strawberries, black raspberries and logan berries but also to all fresh fruit in general such as tomatoes, peaches, apples, cherries and plums.

I claim:
1. A method for the degreening and immunizing of fresh oranges so as to achieve a deep and even coloration characteristic of normally ripe and mature fruit and concurrently retarding decay due to mold and fungus growth without burning and discoloration of such fruit and without substantial deposition of a residue having an offensive taste or toxic effects on humans comprising: subjecting the fresh oranges in a storage chamber to the action of vapors from a liquid mixture consisting of substantially equal portions of 1,1,1-trichloroethane and methylene chloride by volume at a concentration of between 2 and 3 cubic centimeters of such liquid mixture per cubic foot of storage space in which said oranges are being treated, at a temperature of not over about 80° F. for a period of not less than 48 hours in the presence of vapors generated from between 5 and 6 cubic centimeters of ethylene gas per cubic foot of such storage chamber, said liquid mixture and mixture of vapors being characterized by having a high volatility and vapor pressure, no flash point, being non-combustible at normal temperature, and being non-toxic to humans at a concentration of more than 400 p.p.m.

2. A method for the degreening and immunizing of fresh strawberries so as to achieve a deep and even coloration characteristic of normally ripe and mature fruit and concurrently retarding decay due to mold and fungus growth without burning and discoloration of such fruit and without substantial deposition of a residue having an offensive taste or toxic effects on humans comprising subjecting the fresh strawberries in a storage chamber to the action of vapors from a liquid mixture consisting of substantially equal portions of 1,1,1-trichloroethane and methylene chloride by volume at a concentration of between 2 and 3 cubic centimeters of such liquid mixture per cubic foot of storage space in which said strawberries are being treated at a temperature of not over about 80° F. for a period of not less than 24 hours, said liquid mixture and mixture of vapors being characterized by having a high volatility and vapor pressure, no flash point, being non-combustible at normal temperatures, and being non-toxic to humans at a concentration of more than 400 p.p.m.

3. A method for degreening fresh fruit and concurrently retarding decay thereof without burning and discoloration of such fruit and without substantial deposition of a residue having an offensive taste or toxic effects on humans comprising subjecting the fruit in a storage chamber to the action of vapors from a liquid mixture consisting of between 25 to 75 volume percent of 1,1,1-trichloroethane and 75 to 25 volume percent of methylene chloride at a concentration of between 1 and 4 cubic centimeters of such liquid mixture per cubic foot of storage space in which said fruit is being treated, at a temperature of not over about 80° F. and for a period of not less than 48 hours.

4. A method as stated in claim 3 wherein said fruit is citrus fruit.

5. A method as stated in claim 3 wherein said fruit are berries.

6. In a method for the treating of fresh fruit the step of contacting said fruit with a mixture comprising 1,1,1-trichloroethane and methylene chloride, said mixture having a high volatility and the vapors therefrom being non-combustible at normal temperatures and being non-toxic to humans at a concentration of more than 400 p.p.m.

7. In a method of treating fresh fruit, the step of subjecting the fresh fruit to the action of mixed vapors from a mixture of between 25 to 75 volume percent of 1,1,1-trichloroethane and 75 to 25 volume percent of methylene chloride, said vapors being non-combustible at normal temperatures and non-toxic to humans at a concentration of more than 400 p.p.m., whereby substantially no 1,1,1-trichloroethane is retained in the pulp of the fruit so treated.

8. An article of commerce for the degreening and immunizing of fresh fruit so as to achieve a deep and even coloration characteristic of normally ripe and mature fruit and concurrently retarding decay due to mold and fungus growth without burning and discoloration of such fruit and without substantial deposition of a residue having an offensive taste or toxic effects on humans consisting of the mixture of 1,1,1-trichloroethane and methylene chloride, said mixture having high volatility and the vapors therefrom being non-combustible at normal temperatures and being non-toxic to humans at a concentration of more than 400 p.p.m.

References Cited in the file of this patent

UNITED STATES PATENTS

| | | |
|---|---|---|
| 2,324,472 | Allen | July 20, 1943 |
| 2,828,210 | Keller | Mar. 25, 1958 |

OTHER REFERENCES

Sax: "Handbook of Dangerous Materials," 1951, pages 386 and 387.